(12) United States Patent
E

(10) Patent No.: US 10,264,321 B2
(45) Date of Patent: Apr. 16, 2019

(54) PRESENTING BULLET SCREEN INFORMATION BASED ON FRIENDSHIP CHAIN DATA

(71) Applicant: TENCENT TECHNOLOGY (SHENZHEN) COMPANY LIMITED, Shenzhen (CN)

(72) Inventor: Wanyou E, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/629,770

(22) Filed: Jun. 22, 2017

(65) Prior Publication Data

US 2017/0289634 A1    Oct. 5, 2017

Related U.S. Application Data

(63) Continuation of application No. PCT/CN2016/080886, filed on May 3, 2016.

(30) Foreign Application Priority Data

Jun. 19, 2015 (CN) .......................... 2015 1 0347600

(51) Int. Cl.
*H04N 21/4788* (2011.01)
*H04L 12/58* (2006.01)
(Continued)

(52) U.S. Cl.
CPC ....... *H04N 21/4788* (2013.01); *H04L 51/046* (2013.01); *H04N 21/25875* (2013.01);
(Continued)

(58) Field of Classification Search
None
See application file for complete search history.

(56) References Cited

U.S. PATENT DOCUMENTS 8,555,177 B1    10/2013    Junee
9,015,590 B2    4/2015    Kao et al.
(Continued)

FOREIGN PATENT DOCUMENTS

CN    101969412 A    2/2011
CN    102790923 A    11/2012
(Continued)

OTHER PUBLICATIONS

International Search Report in international application No. PCT/CN2016/080886, dated Aug. 4, 2016.
(Continued)

*Primary Examiner* — Hoang Vu A Nguyen Ba
(74) *Attorney, Agent, or Firm* — Anova Law Group, PLLC

(57) ABSTRACT

Disclosed is a bullet screen information processing method and system, and computer storage medium. User information is acquired; when output of video data is detected, friendship chain data are acquired based on the user information, the friendship chain data including other user information associated with the user information; input information for the video data is filtered based on the friendship chain data to obtain first input information associated with the other user information from a friendship chain; and the first input information and the video data are controlled to be output.

12 Claims, 11 Drawing Sheets

(51) Int. Cl.
  *H04N 21/45* (2011.01)
  *H04N 21/258* (2011.01)
  *H04N 21/431* (2011.01)
  *H04N 21/454* (2011.01)
  *H04N 21/488* (2011.01)

(52) U.S. Cl.
  CPC ..... *H04N 21/4316* (2013.01); *H04N 21/4532* (2013.01); *H04N 21/4542* (2013.01); *H04N 21/4882* (2013.01)

(56) References Cited

U.S. PATENT DOCUMENTS

| | | | |
|---|---|---|---|
| 2007/0143778 A1* | 6/2007 | Covell | G06F 17/30743 725/19 |
| 2009/0015660 A1* | 1/2009 | Vedantham | H04N 7/17318 348/14.09 |
| 2010/0027836 A1 | 2/2010 | Sakurada | |
| 2011/0173300 A1* | 7/2011 | Levy | H04N 7/141 709/219 |
| 2011/0214148 A1* | 9/2011 | Gossweiler, III | H04N 21/235 725/46 |
| 2011/0231872 A1* | 9/2011 | Gharachorloo | H04N 21/4126 725/28 |
| 2011/0260344 A1 | 10/2011 | Shanahan | |
| 2012/0047533 A1* | 2/2012 | Westberg | H04N 5/44543 725/46 |
| 2012/0240177 A1* | 9/2012 | Rose | H04N 21/252 725/116 |
| 2013/0325954 A1 | 12/2013 | Cupala et al. | |
| 2014/0089800 A1 | 3/2014 | Kao et al. | |
| 2015/0347463 A1 | 12/2015 | Voss | |
| 2015/0347561 A1 | 12/2015 | Voss | |
| 2015/0350481 A1 | 12/2015 | Voss | |
| 2015/0350535 A1 | 12/2015 | Voss | |

FOREIGN PATENT DOCUMENTS

| | | | | |
|---|---|---|---|---|
| CN | 103150325 A | | 6/2013 | |
| CN | 103607659 A | | 2/2014 | |
| CN | 103916712 A | | 7/2014 | |
| CN | 104754420 A | | 7/2015 | |
| CN | 104754420 B | * | 7/2015 | ......... H04N 21/4756 |
| CN | 104936035 A | | 9/2015 | |
| WO | 2015038338 A1 | | 3/2015 | |

OTHER PUBLICATIONS

Notification of the First Office Action of Chinese application No. 201510347600.X, dated Jun. 28, 2017.

* cited by examiner

PRESENTING BULLET SCREEN INFORMATION BASED ON FRIENDSHIP CHAIN DATA

CROSS-REFERENCE TO RELATED APPLICATIONS

This is a continuation application of International Patent Application No. PCT/CN2016/080886, filed on May 3, 2016, which claims priority to Patent Application No. 201510347600.X, filed before Chinese Patent Office on Jun. 19, 2015 and entitled "bullet screen information processing method and system, and computer storage medium", the entire contents of which are incorporated herein by reference.

BACKGROUND

In order to make a user who watches a video able to interact with other people watching the same video, a video bullet screen technology emerges. Video bullet screens refer to comments directly displayed on a video. The user may watch the video while synchronously making bullet screen comments. The bullet screen comments will be displayed on a video picture in a sliding subtitle form. Thus, when watching the video, the user may view bullet screen comments from other people, or may make his/her own bullet screen comments to be viewed by other people, so as to form an instant interaction experience, thereby increasing the video watching pleasure.

The inventor of the present application found at least the following technical problems in the related art in a process of implementing the technical solutions in the embodiments of the present application.

In the prior art, all bullet screen comments for a certain video will be displayed on a video screen. When a great number of users make bullet screen comments at the same time, a great number of comments will emerge on the video screen at the same time, thereby seriously blocking the video screen per se and influencing the video watching experience. In addition, the interaction mode based on bullet screen comments is monotonous. For example, a user who sees a bullet screen comment does not know who made the bullet screen comment. For another example, a user cannot reply to a certain bullet screen comment. However, no effective solution has been proposed yet at present for the aforementioned problem in the related art.

SUMMARY

The disclosure relates to an information processing technology, and in particular to a bullet screen information processing method and system, and a computer storage medium.

In the embodiments of the disclosure, it is intended to provide a bullet screen information processing method and system, and a computer storage medium, capable of improving the video watching experience of a user and preventing a video screen from being blocked by a great number of comments.

According to an embodiment of the disclosure, a bullet screen information processing method is provided, in which user information is acquired; friendship chain data are acquired based on the user information, the friendship chain data including other user information associated with the user information; input information for video data is filtered based on the friendship chain data to obtain first input information associated with the other user information from a friendship chain; and the first input information and the video data are controlled to be output.

According to another embodiment of the disclosure, a bullet screen information processing system is provided, which may include: a user information module, a bullet screen information module and a video information module, wherein the user information module is configured to acquire user information; the bullet screen information module is configured to acquire friendship chain data based on the user information acquired by the user information module, the friendship chain data including other user information associated with the user information, and filter input information for video data based on the friendship chain data to obtain first input information associated with the other user information from a friendship chain; and the video information module is configured to control the first input information obtained by the bullet screen information module and the video data to be output.

According to yet another embodiment of the disclosure, a computer storage medium is provided, in which computer-executable instructions are stored, for executing the bullet screen information processing method in the embodiments of the disclosure.

According to the bullet screen information processing method and system and the computer storage medium provided in the embodiments of the disclosure, user information is acquired; friendship chain data are acquired based on the user information, the friendship chain data including other user information associated with the user information; input information for video data is filtered based on the friendship chain data to obtain first input information associated with the other user information from a friendship chain; and the first input information and the video data are controlled to be output. Thus, according to the embodiments of the disclosure, all pieces of bullet screen comment information are filtered based on a friendship of a user, and bullet screen comment information made by other users having a friendship with the user is selected and displayed. On one hand, the number of pieces of bullet screen comment information is decreased, and a video screen is prevented from being greatly blocked to influence the video watching experience of the user. On the other hand, styles for interaction based on bullet screen comments are enriched, real-time interaction of users based on bullet screen comments during video watching is implemented, and the pleasure of the users for video watching is increased.

DETAILED DESCRIPTION

The disclosure will be further illustrated hereinbelow in conjunction with the drawings and specific embodiments in detail.

Figure 1:
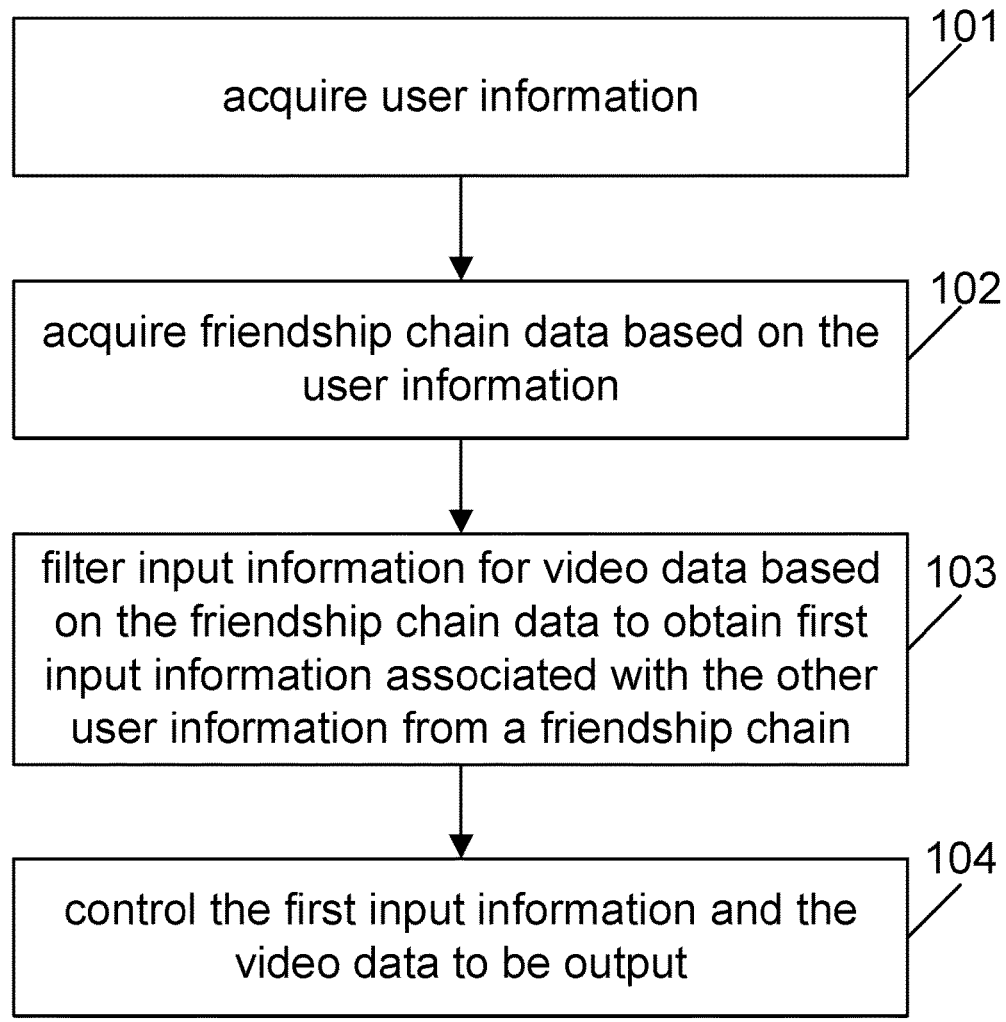
FIG. 1 is a flowchart of a bullet screen information processing method according to an embodiment of the disclosure.

An embodiment of the disclosure provides a bullet screen information processing method. FIG. 1 is a flowchart of a bullet screen information processing method according to an embodiment of the disclosure. As shown in FIG. 1, the bullet screen information processing method includes the following steps.

In Step 101, user information is acquired.

The bullet screen information processing method in the embodiment of the disclosure is applied to a bullet screen information processing system. The user information is acquired in the present step. That is, the bullet screen information processing system acquires the user information. The bullet screen information processing system is arranged in a server or server cluster from which video data originates. If the video data originates from a server or server cluster with which a QQLive client is associated, the bullet screen information processing system is arranged in the server or server cluster with which the QQLive client is associated. The bullet screen information processing system may also be arranged in a webpage server or server cluster. If a user opens the video data via a QQ browser, the bullet screen information processing system may be arranged in a webpage server or server cluster with which the QQ browser is associated.

In the present step, the user information is personal information of the user, specifically including an identity code (ID) of the user, personal data of the user and the like. The user information may be obtained after completing login and authentication processes of the user. Specifically, the user inputs login information such as a user name and a password. The bullet screen information processing system authenticates the login information of the user based on the user name and the password. After authentication is passed, the bullet screen information processing system returns the ID of the user, and obtains the personal information of the user from a database based on the ID of the user.

As an implementation, the personal information of the user (specifically, the ID of the user) is associated with a communication application user identity of the user, e.g., a QQ number, a WeChat account and a phone number. The ID of the user in the present implementation may specifically be a communication application identity such as a QQ number, a WeChat account or a phone number.

In Step 102, friendship chain data are acquired based on the user information, the friendship chain data including other user information associated with the user information.

In the present embodiment, friendship chain data of the user including other user information associated with the user information are pre-stored in the bullet screen information processing system. It may be understood that the friendship chain data of the user are personal information of other users associated with the user. The friendship chain data are personal information of other users having a friendship with the user (or following each other) specifically. The personal information of the other users specifically includes IDs of the other users. The IDs of the other users may be communication application user identities of the other users such as QQ numbers, WeChat accounts and phone numbers of the other users.

In Step 103, input information for video data is filtered based on the friendship chain data to obtain first input information associated with the other user information from a friendship chain.

In the present embodiment, before the bullet screen information processing system executes Step 101 to Step 104, or executes Step 103 of filtering input information for video data based on the friendship chain data, the method further includes: obtaining input information; and allocating an index identifier for the input information, establishing a mapping relationship between the index identifier and the user information, and establishing a mapping relationship between the index identifier and the video data.

Figure 2:
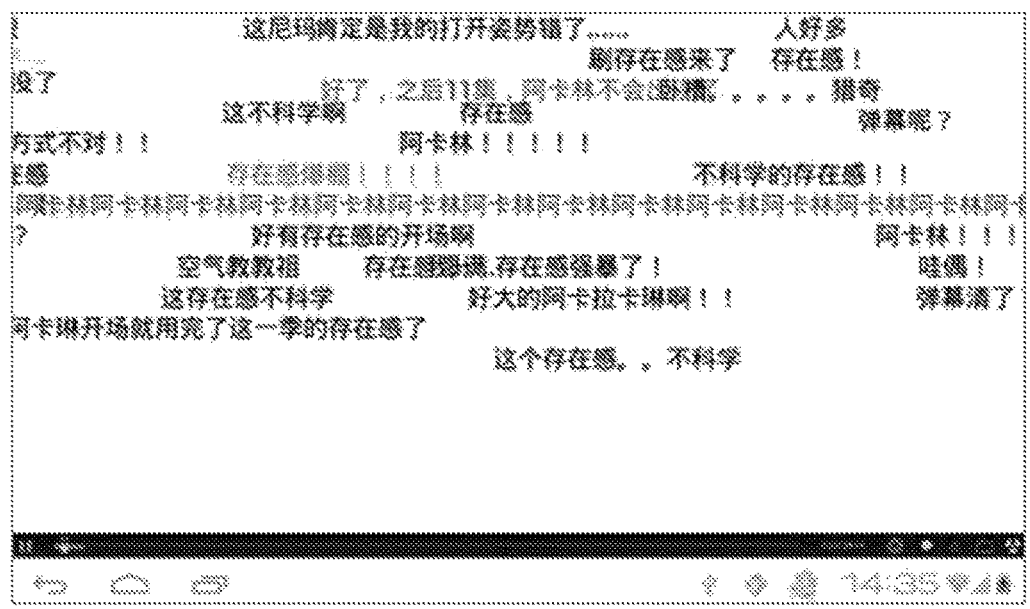
FIG. 2 is a schematic view showing input information according to an embodiment of the disclosure.

Specifically, the input information is comment information input in synchronization with the video data, that is, bullet screen information. FIG. 2 is a schematic view (a simplified screen shot) showing input information according to an embodiment of the disclosure. As shown in FIG. 2, when a user watches a video, the user may interact with other users by inputting comment information, and the comment information may quickly drift across the video, namely bullet screen information.

The input information is input information input by all users viewing the video data within a current preset time period, or input information ever input by users who have viewed the video data. When the bullet screen information processing system receives input information input by any user for a certain piece of video data, an index identifier is allocated for the input information, and a mapping relationship between the index identifier and the user information is established. A plurality of pieces of input information may be received for the video data, each piece of input information being allocated with a respective index identifier. Therefore, an index identifier list is established for each piece of video data, an index identifier of newly received input information is inserted into the index identifier list, that is, a mapping relationship between the index identifier and the video data is established.

In the present step, the step that input information for video data is filtered based on the friendship chain data to obtain first input information associated with the other user information from a friendship chain includes that: other user information associated with the user information is obtained from the friendship chain data; and the input information is filtered based on the other user information to obtain first input information associated with the other user information.

The step that the input information is filtered based on the other user information to obtain first input information associated with the other user information includes that: a pre-configured mapping relationship between an index identifier and user information is searched based on the other user information to obtain at least one index identifier matched with the other user information, the at least one index identifier generating a first index identifier set; the first index identifier set is matched with a pre-configured index identifier set of input information for the video data, to obtain a successfully-matched second index identifier set, index identifiers in the second index identifier set satisfying the first index identifier set and the second index identifier set simultaneously; and input information matched with the index identifiers in the second index identifier set is obtained to serve as the first input information.

Specifically, the bullet screen information processing system obtains other user information associated (or having a friendship) with the user from the friendship chain data of the user, that is, IDs of the other users (specifically, QQ numbers, WeChat accounts and phone numbers of the other users) are obtained, and the input information is filtered based on the IDs of the other users. In the present embodiment, the bullet screen information processing system stores an index identifier list of the video data, the index identifier list including index identifiers of a plurality of pieces of input information for the video data; the bullet screen information processing system further stores a mapping relationship between index identifiers of input information and user information; after obtaining the IDs of the other users, the bullet screen information processing system queries the stored mapping relationship between index identifiers and user information based on the IDs of the other users to obtain index identifiers matched with the IDs of the other users so as to generate a first index identifier set, that is, index identifiers of input information (bullet screen information) input by the other users are obtained; further, the index identifiers in the first index identifier set are matched with index identifiers in the stored index identifier list of the video data to obtain successfully-matched index identifiers so as to generate a second index identifier set, that is, index identifiers of input information (bullet screen information) input by the other users for the video data are obtained; and finally, the bullet screen information processing system searches the stored input information for first input information based on the index identifiers in the second index identifier set, index identifiers of the first input information being matched with the index identifiers in the second index identifier set, there is at least one piece of the first input information.

In Step 104, the first input information and the video data are controlled to be output.

Here, the step that the first input information and the video data are controlled to be output includes that: the first input information is inserted into frame data corresponding to the video data to generate new video data; and the new video data are controlled to be output.

Specifically, the bullet screen information processing system stores an index identifier list of the video data, the index identifier list including index identifiers of a plurality of pieces of input information for the video data and specifically including index identifiers of input information corresponding to a frame data range of the video data. For example, if an index identifier of input information corresponding to frame number 1 to frame number 10 is a, it may be understood that bullet screen information corresponding to the index identifier a is slidably input and displayed in a first frame to a tenth frame of the video data.

By means of the technical solution in the embodiment of the disclosure, all pieces of bullet screen comment information are filtered based on a friendship of a user, and bullet screen comment information made by other users having a friendship with the user is selected and displayed. On one hand, the number of pieces of bullet screen comment information is decreased, and a video screen is avoided from being greatly blocked to influence the video watching experience of the user.

Figure 3:
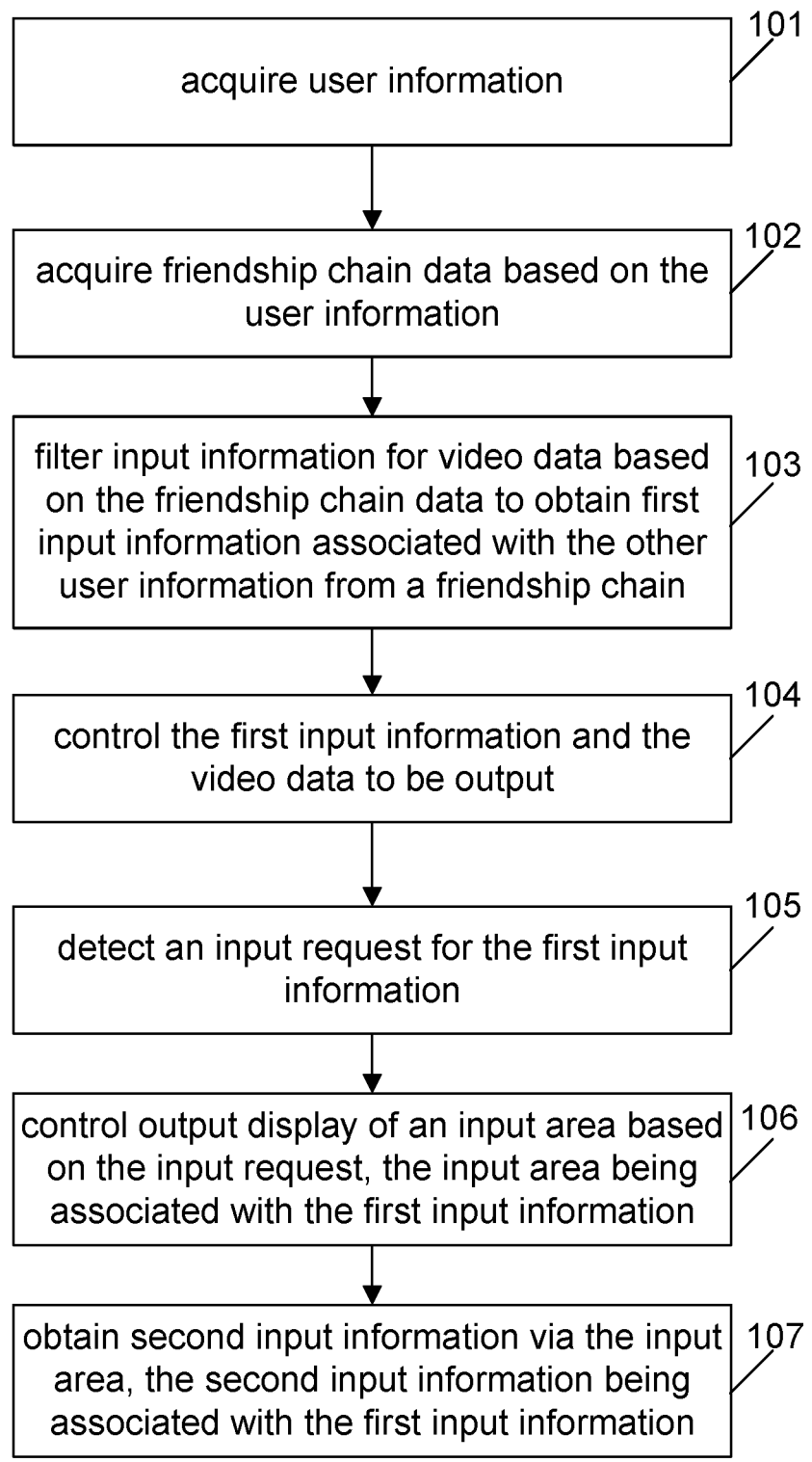
FIG. 3 is a flowchart of a bullet screen information processing method according to an embodiment of the disclosure.

Based on the bullet screen information processing method as described above, an embodiment of the disclosure also provides a bullet screen information processing method. FIG. 3 is a flowchart of a bullet screen information processing method according to an embodiment of the disclosure. As shown in FIG. 3, after Step 104 as described above, the method further includes the following steps.

In Step 105, an input request for the first input information is detected. Here, the first input information may be understood as bullet screen information output in synchronization with video data. In the present embodiment, when controlling the first input information and the video data to be output synchronously, the bullet screen information processing system adds an input interface for the first input information. Based on the input interface, the first input information supports an input response to the first input information.

Figure 4:
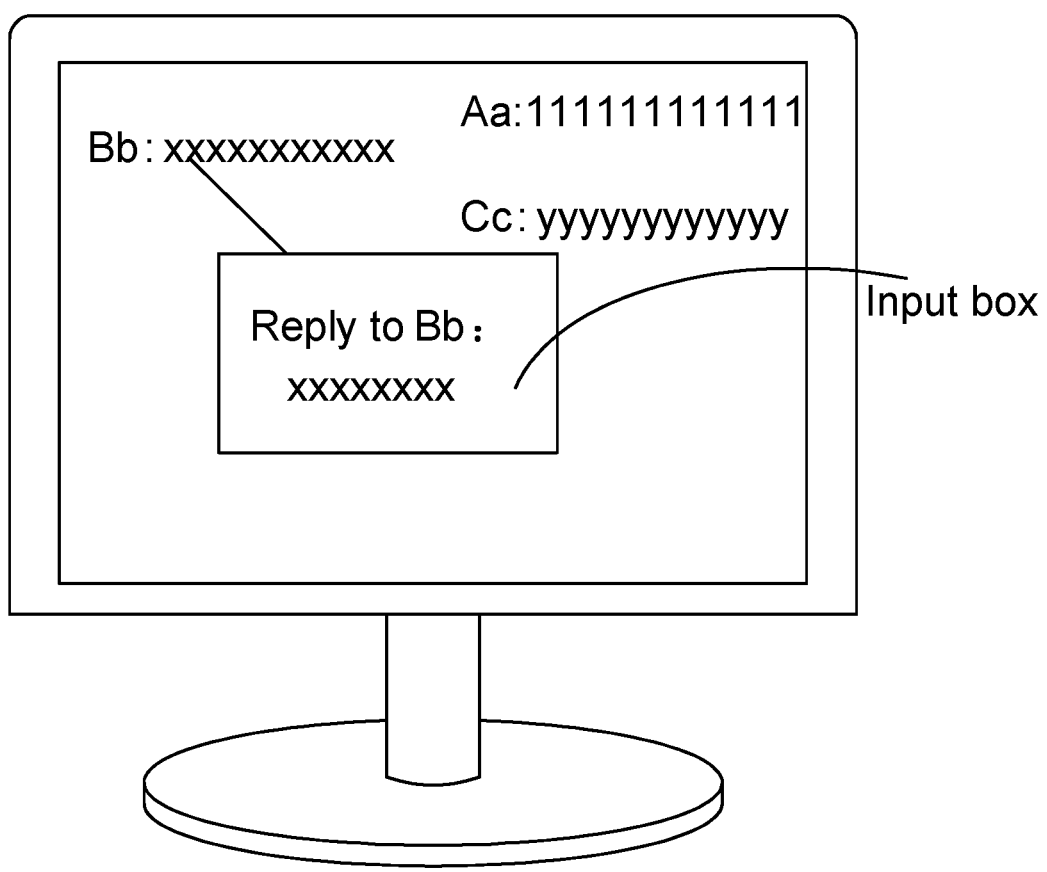
FIG. 4 is a schematic view of an application of an embodiment of the disclosure.

Specifically, FIG. 4 is a schematic view of an application of an embodiment of the disclosure. When the first input information and the video data are output synchronously, a user who desires to reply to a certain piece of bullet screen information in a video data viewing process may directly click the bullet screen information. As shown in FIG. 4, when the user desires to reply to bullet screen information from a user ID 'Bb', the user clicks the bullet screen information from the user ID 'Bb'. At this time, the bullet screen information processing system receives an input request for the bullet screen information.

In Step 106, output display of an input area is controlled based on the input request, the input area being associated with the first input information.

Here, when the bullet screen information processing system receives the input request for the first input information, an input area is generated for the input request, and the input area may be specifically shown as an input box in FIG. 4. In practical application, the input area may suspend over a video screen; and the user may input contents to be replied in the input area. The input area corresponds to first input information (i.e., bullet screen information) to be replied, and thus the input area may pre-display the user ID corresponding to the input information to be replied, as shown in FIG. 4.

In Step 107, second input information is obtained via the input area, the second input information being associated with the first input information.

In the present embodiment, the user inputs contents to be replied in the input area, and then sends the input contents to the bullet screen information processing system after the input is completed. It may be understood that the user inputs information into the input box as shown in FIG. 4, clicks a 'send' key or an 'enter' key after completion, that is, sends the input information to the bullet screen information processing system, and the input information obtained by the bullet screen information processing system is the second input information in the present step. Further, the second input information includes an identifier of the first input information, and the identifier of the first input information may specifically be user information of the first input information, such as the user ID.

As another implementation, after the second input information is obtained, the method further includes that: the second input information and the video data are controlled to be output.

Specifically, as the second input information is the contents replied by the user to the first input information, after obtaining the second input information, the bullet screen information processing system adds the user ID of the first input information associated with the second input information to the second input information, and then outputs the second input information in synchronization with the video data, so that when watching a video, the user can visually see that second bullet screen information is information replied to first bullet screen information.

By means of the technical solution in the embodiment of the disclosure, all pieces of bullet screen comment information are filtered based on a friendship of a user, and bullet screen comment information made by other users having a friendship with the user is selected and displayed. On one hand, the number of pieces of bullet screen comment information is decreased, and a video screen is avoided from being greatly blocked to influence the video watching experience of the user. On the other hand, the styles of interaction based on bullet screen comments are enriched, real-time interaction of users based on bullet screen comments during video watching is implemented, and the pleasure of the users for video watching is increased.

Figure 5:
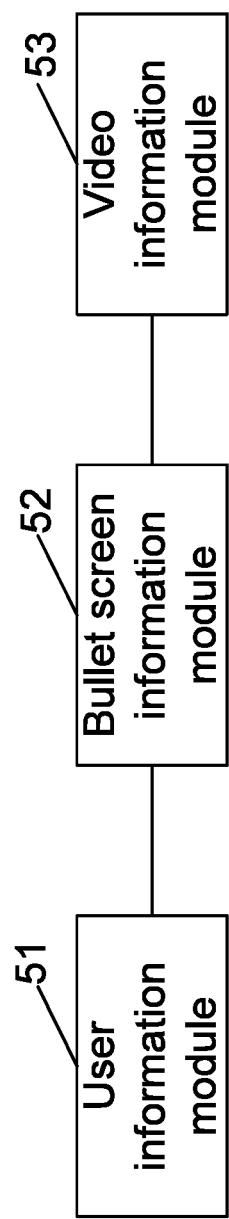
FIG. 5 is a first structure diagram of a bullet screen information processing system according to an embodiment of the disclosure.

An embodiment of the disclosure provides a bullet screen information processing system. FIG. 5 is a first structure diagram of a bullet screen information processing system according to an embodiment of the disclosure. The system includes: a user information module 51, a bullet screen information module 52 and a video information module 53.

The user information module 51 is configured to acquire user information.

The bullet screen information module 52 is configured to acquire friendship chain data based on the user information acquired by the user information module, the friendship chain data including other user information associated with the user information, and filter input information for video data based on the friendship chain data to obtain first input information associated with the other user information from a friendship chain.

The video information module 53 is configured to control the first input information obtained by the bullet screen information module 52 and the video data to be output.

Here, the user information is personal information of a user, specifically including an identity code (ID) of the user, personal data of the user and the like. The user information may be obtained after completing login and authentication processes of the user via the user information module 51. Specifically, the user inputs login information such as a user name and a password. The user information module 51 authenticates the login information of the user based on the user name and the password. After authentication is passed, the user information module 51 returns the ID of the user, and obtains the personal information of the user from a database based on the ID of the user.

As an implementation, the personal information of the user (specifically, the ID of the user) is associated with a communication application user identity of the user, e.g., a QQ number, a WeChat account and a phone number. The ID of the user in the present implementation may specifically be a communication application identity such as a QQ number, a WeChat account or a phone number.

In the present embodiment, friendship chain data of the user are pre-stored in the bullet screen information processing system, and the friendship chain data may be stored in the user information module 51. The friendship chain data of the user include other user information associated with the user information. It may be understood that the friendship chain data of the user are personal information of other users associated with the user. The friendship chain data are personal information of other users having a friendship with the user (or following each other) specifically. The personal information of the other users specifically includes IDs of the other users. The IDs of the other users may be communication application user identities of the other users such as QQ numbers, WeChat accounts and phone numbers of the other users.

As an implementation, the bullet screen information module 52 is configured to obtain, before filtering the input information for the video data based on the friendship chain data, input information, and further configured to allocate an index identifier for the input information, establish a mapping relationship between the index identifier and the user information, and establish a mapping relationship between the index identifier and the video data.

Specifically, the input information is comment information input in synchronization with the video data, that is, bullet screen information. As shown in FIG. 2, when a user watches a video, the user may interact with other users by inputting comment information, and the comment information may quickly drift across the video, namely bullet screen information.

The input information is input information input by all users viewing the video data within a current preset time period, or input information ever input by users who have viewed the video data. When the bullet screen information module 52 receives input information input by any user for a piece of certain video data, an index identifier is allocated for the input information, and a mapping relationship between the index identifier and the user information is established. The bullet screen information module 52 may receive a plurality of pieces of input information for the video data, each piece of input information being allocated with a respective index identifier. Therefore, an index identifier list is established for each piece of video data, an index identifier of newly received input information is inserted into the index identifier list, that is, a mapping relationship between the index identifier and the video data is established.

As an implementation, the bullet screen information module 52 is configured to obtain other user information associated with the user information from the friendship chain data, and filter the input information based on the other user information to obtain first input information associated with the other user information.

The bullet screen information module 52 is configured to: search a pre-configured mapping relationship between an index identifier and user information based on the other user information to obtain at least one index identifier matched with the other user information, the at least one index identifier generating a first index identifier set; match the first index identifier set with a pre-configured index identifier set of input information for the video data, to obtain a successfully-matched second index identifier set, index identifiers in the second index identifier set satisfying the first index identifier set and the second index identifier set simultaneously; and obtain input information matched with the index identifiers in the second index identifier set to serve as the first input information.

Specifically, the bullet screen information module 52 obtains other user information associated (or having a friendship) with the user from the friendship chain data of the user, that is, IDs of the other users (specifically, QQ numbers, WeChat accounts and phone numbers of the other users) are obtained, and the input information is filtered based on the IDs of the other users. In the present embodiment, the bullet screen information module 52 stores an index identifier list of the video data, the index identifier list including index identifiers of a plurality of pieces of input information for the video data; the bullet screen information module 52 further stores a mapping relationship between index identifiers of input information and user information; after obtaining the IDs of the other users, the bullet screen information module 52 queries the stored mapping relationship between index identifiers and user information based on the IDs of the other users to obtain index identifiers matched with the IDs of the other users so as to generate a first index identifier set, that is, index identifiers of input information (bullet screen information) input by the other users are obtained; further, the index identifiers in the first index identifier set are matched with index identifiers in the stored index identifier list of the video data to obtain successfully-matched index identifiers so as to generate a second index identifier set, that is, index identifiers of input information (bullet screen information) input by the other users for the video data are obtained; and finally, the bullet screen information module 52 searches the stored input information for first input information based on the index identifiers in the second index identifier set, index identifiers of the first input information being matched with the index identifiers in the second index identifier set, there is at least one piece of the first input information.

Those skilled in the art shall understand that functions of all processing modules in the bullet screen information processing system according to the embodiment of the disclosure may be understood with reference to relevant description of the aforementioned bullet screen information processing method. All processing modules in the bullet screen information processing system according to the embodiment of the disclosure may be implemented via an analogue circuit for achieving the functions according to the embodiment of the disclosure, or may be implemented by running software for executing the functions according to the embodiment of the disclosure on a smart terminal.

Based on the bullet screen information processing system as described above, an embodiment of the disclosure also provides a bullet screen information processing system. The bullet screen information processing system in the present embodiment may be shown in FIG. 5. Based on the technical solution of each functional module in the bullet screen information processing system as described above, in the present embodiment, the bullet screen information module 52 is further configured to: detect an input request for the first input information; control output display of an input area based on the input request, the input area being associated with the first input information; and obtain second input information via the input area, the second input information being associated with the first input information.

Further, the video information module 53 is further configured to control the second input information and the video data to be output.

In the present embodiment, the bullet screen information module 52 adds an input interface to the first input information; and based on the input interface, the first input information supports an input response to the first input information. Specifically, when the bullet screen information and the video data are output synchronously, a user who desires to reply to a certain piece of bullet screen information in a video data viewing process may directly click the bullet screen information. As shown in FIG. 4, when the user desires to reply to bullet screen information from a user ID 'Bb', the user clicks the bullet screen information from the user ID 'Bb'. At this time, the bullet screen information module 52 receives an input request for the bullet screen information. When the bullet screen information module 52 receives the input request for the first input information, an input area is generated for the input request, and the input area may be specifically shown as an input box in FIG. 4. In practical application, the input area may suspend over a video screen; and the user may input contents to be replied in the input area. The input area corresponds to first input information (i.e., bullet screen information) to be replied, and thus the input area may pre-display the user ID corresponding to the input information to be replied, as shown in FIG. 4.

The user inputs contents to be replied in the input area, and then sends the input contents to the bullet screen information module 52 after input is completed. It may be understood that the user inputs information into the input box as shown in FIG. 4, clicks a 'send' key or an 'enter' key after completion, that is, sends the input information to the bullet screen information module 52, and the input information obtained by the bullet screen information module 52 is the second input information in the present step. Further, the second input information includes an identifier of the first input information, and the identifier of the first input information may specifically, be user information of the first input information such as the user ID. Finally, after obtaining the second input information, the bullet screen information module 52 adds the user ID of the first input information associated with the second input information to the second input information, and the video information module 53 controls the second input information to which the user ID of the first input information is added and the video data to be synchronously output.

Those skilled in the art shall understand that functions of all processing modules in the bullet screen information processing system according to the embodiment of the disclosure may be understood with reference to relevant description of the aforementioned bullet screen information processing method. All processing modules in the bullet screen information processing system according to the embodiment of the disclosure may be implemented via an analogue circuit for achieving the functions according to the embodiment of the disclosure, or may be implemented by running software for executing the functions according to the embodiment of the disclosure on a smart terminal.

In one or more embodiments of the disclosure, the user information module 51, the bullet screen information module 52 and the video information module 53 of the bullet screen information processing system may be implemented by a Central Processing Unit (CPU), a Digital Signal Processor (DSP) or a Field-Programmable Gate Array (FPGA) in the bullet screen information processing system in practical application.

Figure 6:
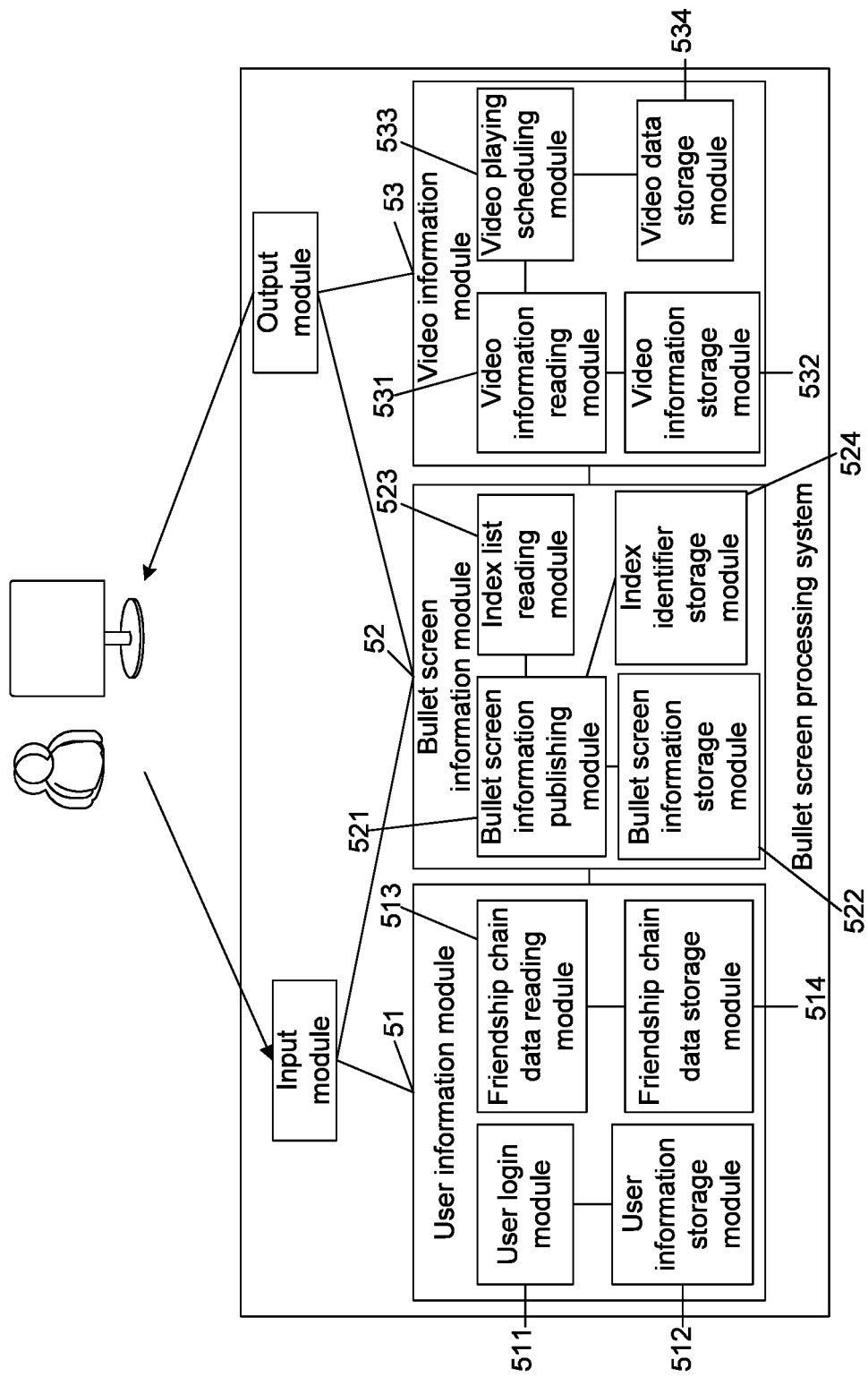
FIG. 6 is a second structure diagram of the bullet screen information processing system according to an embodiment of the disclosure.

The bullet screen information processing system based on the above one or more embodiments includes a data input function and a data output function, that is, the bullet screen information processing system may be divided into an input device and an output device. FIG. 6 is a second structure diagram of the bullet screen information processing system according to an embodiment of the disclosure. The bullet screen information processing system includes functional modules shown in the above one or more embodiments and FIG. 5, namely a user information module 51, a bullet screen information module 52 and a video information module 53. The user information module 51 is mainly configured to maintain login information and friendship chain data of a user; the bullet screen information module 52 is mainly configured to logically read/write and store bullet screen information (and input information in the above one or more embodiments); the video information module 53 is mainly configured to manage video information and schedule a video playing policy; in the present embodiment, the bullet screen information processing system further includes an input module and an output module; the input module is configured to receive information input by the user, including the input login information and the input bullet screen information, and is further configured to receive a request of the user, including a video request, etc.; and the output module is configured to output the video data, the bullet screen information, etc.

Specifically, as shown in FIG. 6, the user information module 51 includes a user login module 511, a user information storage module 512, a friendship chain data reading module 513 and a friendship chain data storage module 514. The user login module 511 is configured to authenticate the login information of the user, return an ID of the user after login succeeds, and read personal data of the user from the user information storage module 512 based on the ID. The friendship chain data reading module 513 is configured to read friendship chain data of the user from the friendship chain data storage module 514 according to the ID of the user. The user information storage module 512 is configured to store the personal data of the user. The friendship chain data storage module is configured to store a friendship chain of the user.

The bullet screen information module 52 includes: a bullet screen information publishing module 521, a bullet information storage module 522, an index list reading module 523 and an index identifier storage module 524. The bullet screen information publishing module 521 is configured to allocate a unique index identifier (ID) for bullet screen information input by a user, establish a mapping relationship between the index ID and an ID of the user, insert the index ID into an index identifier list corresponding to video data, and further store the bullet screen information corresponding to the index ID into the bullet information storage module 522. The index identifier storage module 524 is configured to store and update an index identifier list of each piece of video data. The bullet information storage module 522 is configured to store specific contents of the bullet screen information. The index list reading module 523 is configured to read an index identifier list of a video ID from the index identifier storage module 524 according to the video ID, further filter the index identifier of the bullet screen information of the friendship chain data of the user from the index identifier list according to the friendship chain data of the user read by the friendship chain data reading module 513, acquire specific bullet screen information from the bullet information storage module 522 according to the acquired index identifier, and send the bullet screen information to the video information module 53.

The video information module 53 includes: a video information reading module 531, a video information storage module 532, a video playing scheduling module 533 and a video data storage module 534. The video information reading module 531 is configured to acquire relevant video information (including video title, introduction, playing address, etc) from the video information storage module 532 according to the video ID. The video playing scheduling module 533 is configured to select a video source file having an appropriate definition for the user according to a playing environment (including: information such as a network bandwidth and player version) of a terminal of the user, and play the video source file. The video information storage module 532 is configured to store and update basic video information (including: video ID, video introduction, title, production year, director, actor, video type, etc). The video data storage module 534 is mainly responsible for storing a video source file encoded to have different code rates.

The bullet screen information processing method in the embodiments of the disclosure will be elaborated in detail hereinbelow in conjunction with the bullet screen information processing system shown in FIG. 6.

Figure 7:
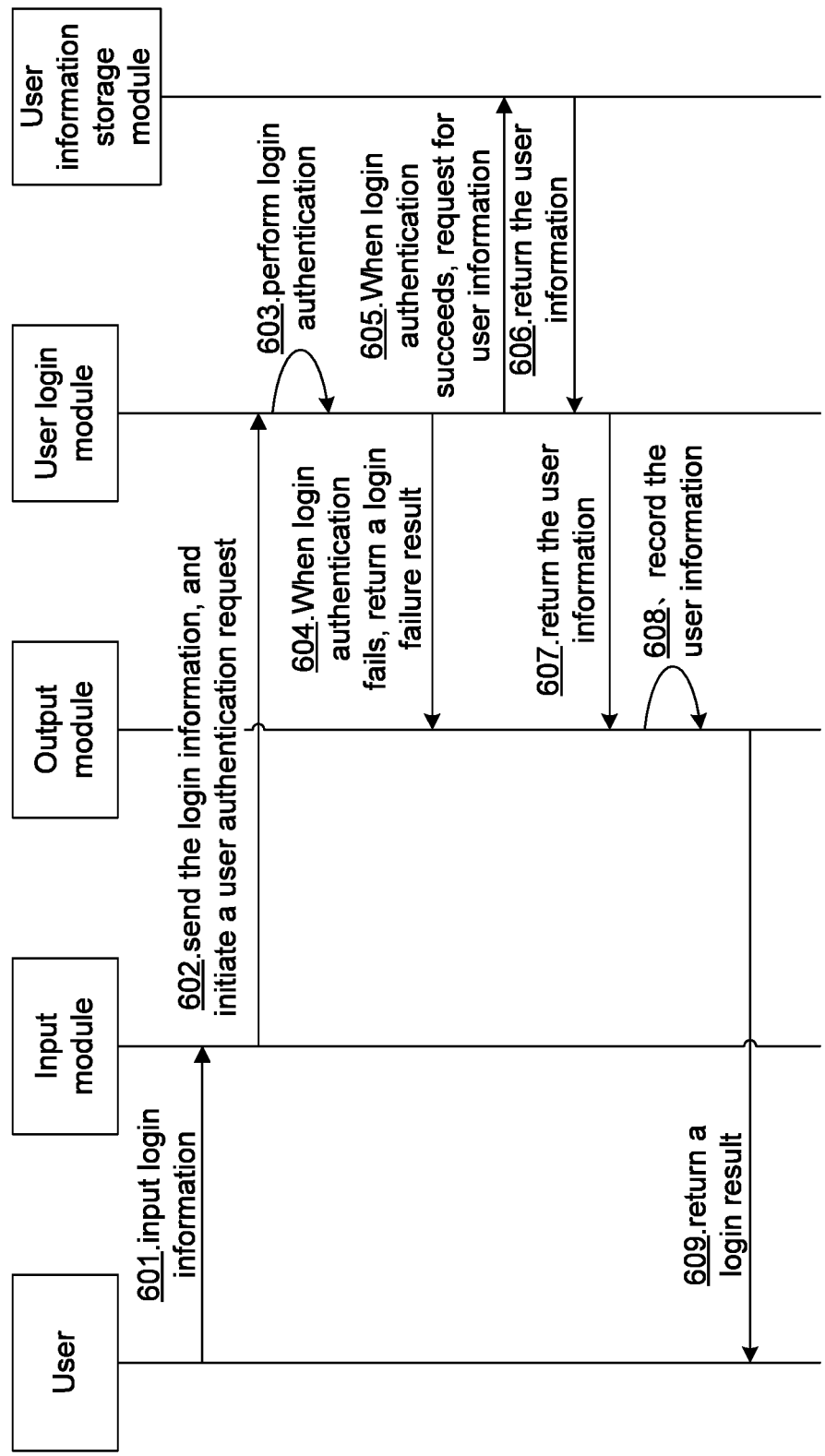
FIG. 7 is a flowchart of a user login method in a bullet screen information processing method according to an embodiment of the disclosure.

FIG. 7 is a flowchart of a user login method in a bullet screen information processing method according to an embodiment of the disclosure. As shown in FIG. 7, in conjunction with the bullet screen information processing system shown in FIG. 6, the method includes the following steps.

In Step 601, a user inputs a login ID and an authentication key of the user via an input device, and initiates a user authentication request.

In Step 602, the input device sends the login ID and the authentication key input by the user to a user login module, and initiates the user authentication request.

In Step 603, when receiving the user authentication request, the user login module executes a login authentication operation according to the ID and the authentication key of the user.

In Step 604, when login authentication fails, the user login module directly returns an authentication failure result to an output device, and Step 609 is executed.

In Step 605, when login authentication succeeds, the user login module obtains the ID of the user, and requests a user information storage module for user information based on the ID of the user.

In Step 606, a user data storage module returns the user information to the user login module.

In Step 607, the user login module returns a login success result and the user information to the output device.

In Step 608, the output device records the user information locally.

In Step 609, the output device returns a login result to the user; when login authentication fails, the login authentication failure result is returned; and when login authentication succeeds, the login authentication success result and user data are returned.

Figure 8:
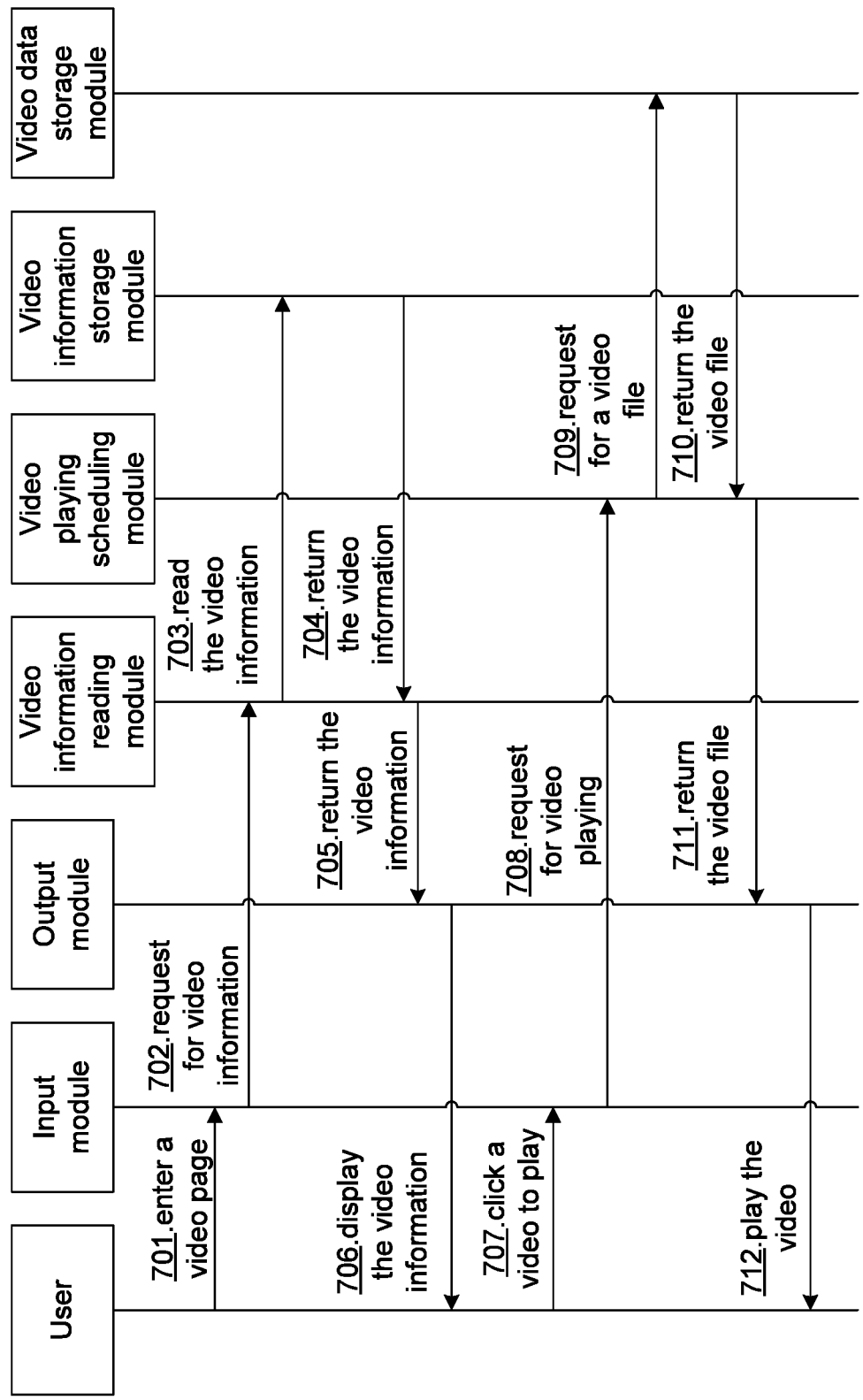
FIG. 8 is a flowchart of requesting of video playing in a bullet screen information processing method according to an embodiment of the disclosure.

FIG. 8 is a flowchart of requesting for playing a video in a bullet screen information processing method according to an embodiment of the disclosure. As shown in FIG. 8, in conjunction with the bullet screen information processing system shown in FIG. 6, the method includes the following steps.

In Step 701, a user enters a video page. It may be understood as entering a video playing website or opening a video player.

In Step 702, an input device requests a video information reading module for video information, including: video list, ID of each video, introduction information of the video, and the like.

In Step 703, the video information reading module initiates a reading request for the video information to a video information storage module.

In Step 704, the video information storage module returns corresponding video information contents according to the reading request for the video information.

In Step 705, the video information reading module returns the video information contents to an output device.

In Step 706, the output device displays received video contents to the user.

In Step 707, the user selects a video to be played, and clicks it to play. In other words, a request operation for video data is initiated to the input device.

In Step 708, the input device initiates a request to a video playing scheduling module according to a click-to-play operation of the user, and uploads request parameters, the request parameters including: video ID, user equipment information, network bandwidth where a user equipment is located currently, and the like.

In Step 709, the video playing scheduling module selects a video file having an appropriate resolution for the user according to the request parameters, and requests a video file storage module for a corresponding video file.

In Step 710, the video storage module returns the video file to the video playing scheduling module.

In Step 711, the video playing scheduling module returns the video file to the output device.

In Step 712, the output device displays a video to the user. In other words, the user can normally watch the video.

Figure 9:
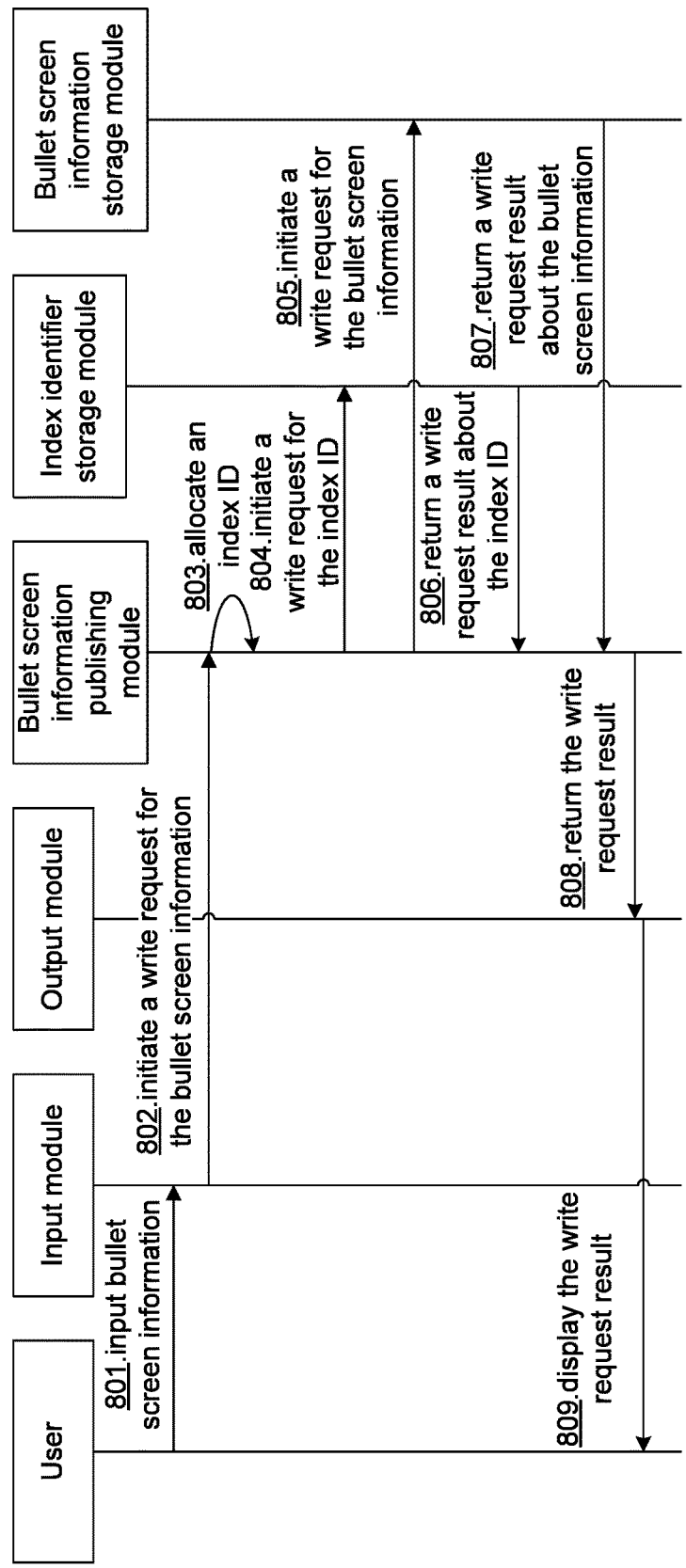
FIG. 9 is a flowchart of an input information write operation in a bullet screen information processing method according to an embodiment of the disclosure.

FIG. 9 is a flowchart of an input information write operation in a bullet screen information processing method according to an embodiment of the disclosure. As shown in FIG. 9, in conjunction with the bullet screen information processing system shown in FIG. 6, the method includes the following steps.

In Step 801, a user inputs bullet screen information via an input device.

In Step 802, the input device initiates a write request for the bullet screen information to a bullet screen information publishing module, request parameters carried in the write request for the bullet screen information including: a currently played video ID, an ID of a user, a frame number of a currently played video frame, bullet screen information contents and the like.

In Step 803, after receiving the write request for the bullet screen information, the bullet screen information publishing module allocates an index ID for the bullet screen information.

In Step 804, the bullet screen information publishing module initiates an index identifier write request to an index identifier storage module, request parameters carried in the index identifier write request including: an index ID, an ID of a user, a video ID, a video frame number and the like.

In Step 805, the bullet screen information publishing module initiates a write request for the bullet screen information to a bullet screen information storage module, request parameters carried in the write request for the bullet screen information including: an index ID and bullet screen information contents.

In Step 806, after completely processing the index identifier write request, the index identifier storage module returns a processing result to the bullet screen information publishing module.

In Step 807, after completely processing the write request for the bullet screen information, the bullet screen information storage module returns a processing result to the bullet screen information publishing module.

In Step 808, after receiving the request processing results returned by the index identifier storage module and the bullet screen information storage module, the bullet screen information publishing module returns a write result about the bullet screen information to an output device according to the returned processing results.

In Step 809, the output device displays the write result about the bullet screen information to the user.

Figure 10:
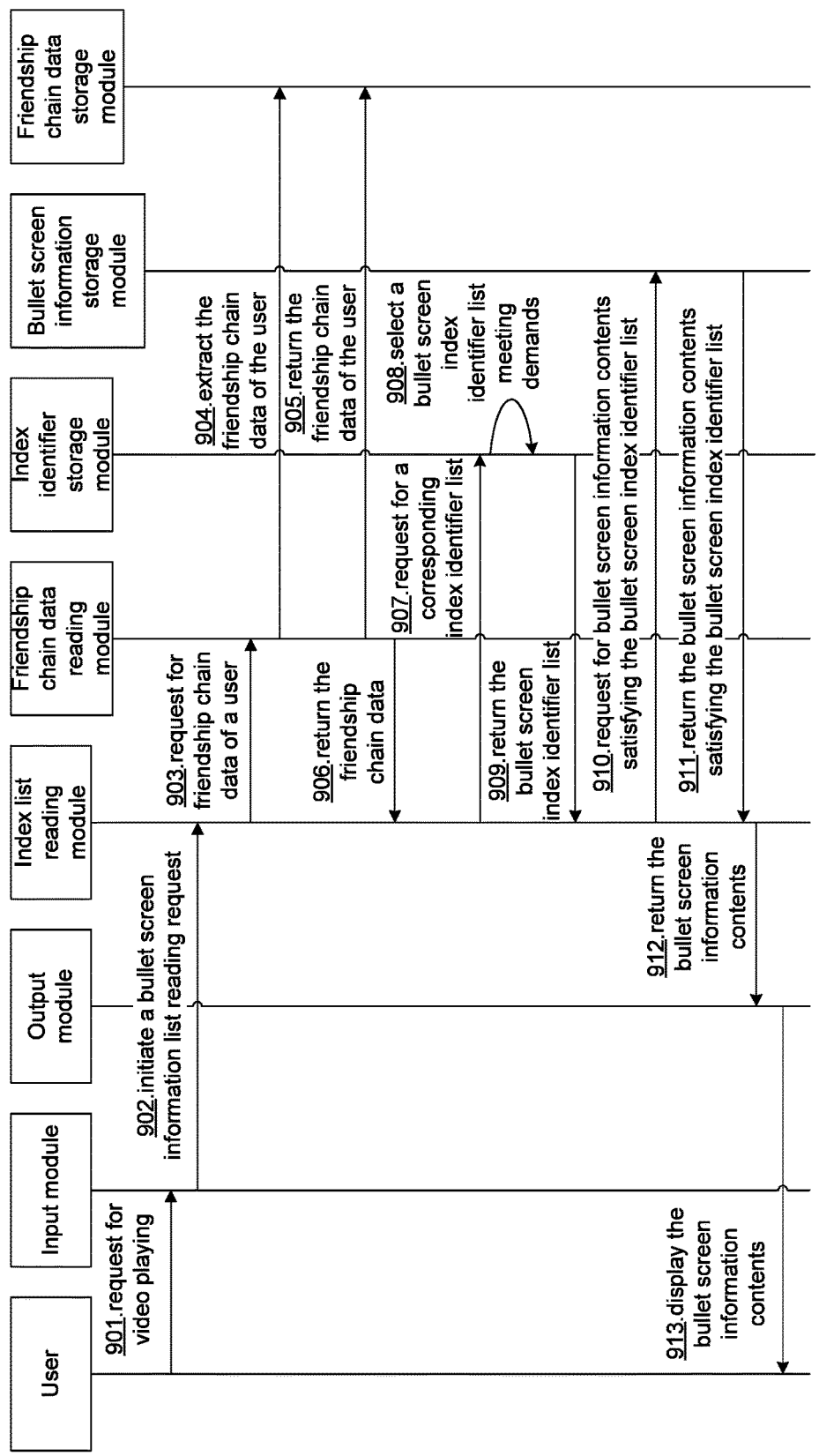
FIG. 10 is a flowchart of an input information read operation in a bullet screen information processing method according to an embodiment of the disclosure.

FIG. 10 is a flowchart of an input information read operation in a bullet screen information processing method according to an embodiment of the disclosure. As shown in FIG. 10, in conjunction with the bullet screen information processing system shown in FIG. 6, the method includes the following steps.

In Step 901, a user executes a video playing operation via an input device.

In Step 902, when a video starts to be played, an input module acquires an ID of a user stored locally, a video ID and a frame number range of a currently played video (e.g., a second video segment of a video having a length of 30$s$ is played currently), and initiates a bullet screen information list reading request to an index list reading module.

In Step 903, after receiving the bullet screen information list reading request, the index list reading module requests a friendship chain data reading module for friendship chain data of a corresponding user according to the ID of the user.

In Step 904, after receiving the request for the friendship chain data of the user, the friendship chain data reading module extracts friendship chain data matched with the ID of the user from a friendship chain data storage module.

In Step 905, the friendship chain data storage module returns the friendship chain data matched with the ID of the user.

In Step 906, the friendship chain data reading module returns the friendship chain data matched with the ID of the user to the index list reading module.

In Step 907, after obtaining the friendship chain data of the user, the index list reading module extracts an index ID list of bullet screen information within a corresponding frame number range from an index identifier storage module according to a current video ID and an ID (e.g., a QQ number and WeChat account of a friend) of each friend in the friendship chain data.

In Step 908, the index identifier storage module selects a bullet screen index identifier list meeting demands according to the video ID, the ID of the friend, and the frame number range.

In Step 909, the index identifier storage module returns the generated bullet screen index identifier list to the index list reading module.

In Step 910, after obtaining the bullet screen index identifier list, the index list reading module requests a bullet screen information storage module for bullet screen information contents satisfying the bullet screen index identifier list.

In Step 911, the bullet screen information storage module returns the bullet screen information contents.

In Step 912, the index list reading module returns the bullet screen information contents to an output module.

In Step 913, the output module displays the bullet screen information contents to the user.

Figure 11:
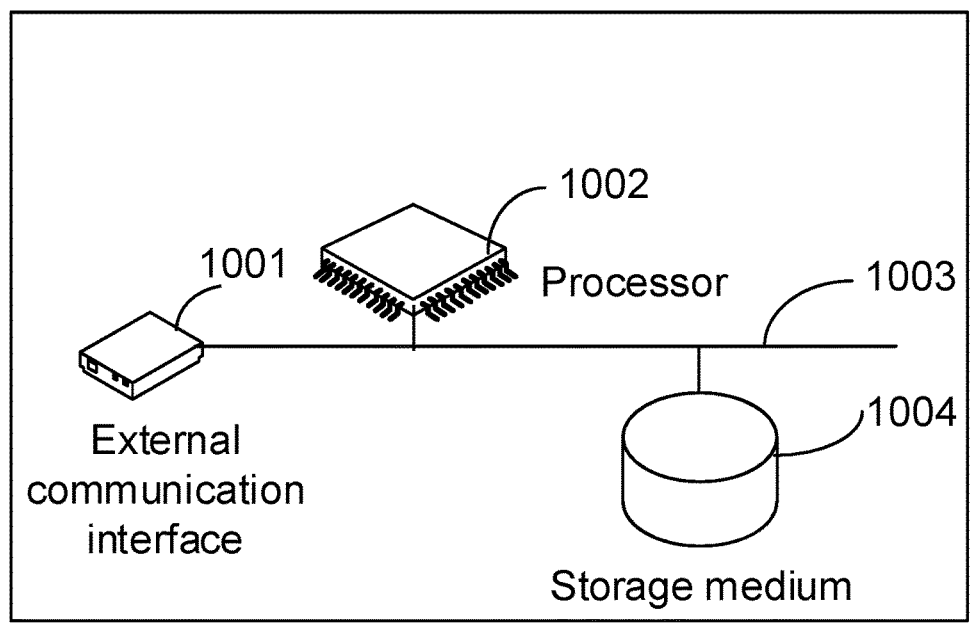
FIG. 11 is a hardware structure diagram of a bullet screen information processing system according to an embodiment of the disclosure.

FIG. 11 is a hardware structure diagram of a bullet screen information processing system according to an embodiment of the disclosure. An example of the bullet screen information processing system serving as a hardware entity is shown in FIG. 11. The bullet screen information processing system includes a processor 1002, a storage medium 1004 and at least one external communication interface 1001. The processor 1002, the storage medium 1004 and the external communication interface 1001 are connected via a bus 1003.

Here, it is to be noted that: the above description related to the system is similar to the above description related to the method and have the same beneficial effects, which will not be elaborated. Technical details undisclosed in the embodiments for the bullet screen information processing system according to the disclosure are subject to the descriptions for the method embodiment of the disclosure.

In some embodiments provided by the disclosure, it should be understood that the disclosed equipment and method may be implemented in another manner. The equipment embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the equipment or the units, and may be electrical and mechanical or adopt other forms.

The abovementioned functional units described as separate parts may or may not be physically separated, and parts displayed as units may or may not be physical units, and namely may be located in the same place, or may also be distributed to multiple network units. Part or all of the units may be selected to achieve the purpose of the solutions of the embodiment according to a practical requirement.

In addition, each function unit in each embodiment of the disclosure may be integrated into a processing unit, each unit may also exist independently, and two or more than two units may also be integrated into a unit. The abovementioned integrated unit may be implemented in a hardware form, and may also be implemented in form of hardware and software function unit.

Those skilled in the art should know that: all or part of the steps of the abovementioned method embodiment may be implemented by instructing related hardware through a program, the abovementioned program may be stored in a computer-readable storage medium, and the program is executed to execute the steps of the abovementioned method embodiment; and the abovementioned storage medium includes: various media capable of storing program codes such as mobile storage equipment, a Read-Only Memory (ROM), a Random Access Memory (RAM), a magnetic disk or an optical disk.

Or, when being implemented in form of software function module and sold or used as an independent product, the integrated unit of the disclosure may also be stored in a computer-readable storage medium. Based on such an understanding, the technical solutions of the embodiment of the disclosure substantially or parts making contributions to the conventional art may be embodied in form of software product, and the computer software product is stored in a storage medium, including a plurality of instructions configured to enable a piece of computer equipment (which may be a personal computer, a server, network equipment or the like) to execute all or part of the method in each embodiment of the disclosure. The abovementioned storage medium includes: various media capable of storing program codes such as mobile storage equipment, an ROM, a magnetic disk or an optical disk.

The above is only the specific implementations of the disclosure and not intended to limit the scope of protection of the disclosure, and any variations or replacements apparent to those skilled in the art within the technical scope disclosed by the disclosure shall fall within the scope of protection of the disclosure. Therefore, the scope of protection of the disclosure shall be subject to the scope of protection of the claims.

According to the embodiments of the disclosure, all pieces of bullet screen comment information are filtered based on a friendship of a user, and bullet screen comment information made by other users having a friendship with the user is selected and displayed. On one hand, the number of pieces of bullet screen comment information is decreased, and a video screen is prevented from being greatly blocked to influence the video watching experience of the user. On the other hand, styles for interaction based on bullet screen comments are enriched, real-time interaction of users based on bullet screen comments during video watching is implemented, and the pleasure of the users for video watching is increased.

What is claimed is:

1. A bullet screen information processing method, executed by one or more servers, the method comprising:
   when a login authentication request from a user equipment according to an identifier (ID) of a user succeeds, acquiring first user information based on the ID of the user;
   acquiring friendship chain data based on the first user information, the friendship chain data comprising second user information associated with the first user information;
   filtering input information for video data based on the friendship chain data, to obtain first input information associated with the second user information in the friendship chain data; and
   controlling the first input information and the video data to be output to the user equipment,
   wherein filtering input information for video data based on the friendship chain data to obtain first input information associated with the second user information in the friendship chain data comprises:
   obtaining second user information associated with the first user information from the friendship chain data;
   searching, based on the second user information, pre-configured mapping relationships between index identifiers and user information for at least one index identifier matched with the second user information, the at least one index identifier forming a first index identifier set;
   matching the first index identifier set with a pre-configured index identifier set of input information for the video data, to obtain a successfully-matched second index identifier set, index identifiers in the second index identifier set satisfying the first index identifier set and the second index identifier set simultaneously; and
   obtaining input information matched with the index identifiers in the second index identifier set to serve as the first input information.

2. The method according to claim 1, wherein before filtering the input information for the video data based on the friendship chain data, the method further comprises:
   obtaining the input information, wherein the input information comprises at least one piece of input information; and
   for each piece of the input information, allocating an index identifier, establishing a mapping relationship between the index identifier and user information associated with the piece of the input information, and establishing a mapping relationship between the index identifier and the video data.

3. The method according to claim 1, wherein after the first input information and the video data are output, the method further comprises:
   detecting an input request for the first input information;

controlling output and display of an input area based on the input request, the input area being associated with the first input information; and obtaining second input information via the input area, the second input information being associated with the first input information.

4. The method according to claim 3, further comprising: controlling the second input information and the video data to be output.

5. A bullet screen information processing system, comprising:
a processor; and
a memory storing instructions executable by the processor;
wherein the processor is configured to:
when a login authentication request from a user equipment according to an identifier (ID) of a user succeeds, acquire first user information based on the ID of the user;
acquire friendship chain data based on the first user information, the friendship chain data comprising second user information associated with the first user information;
filter input information for video data based on the friendship chain data, to obtain first input information associated with the second user information in the friendship chain data; and
control the first input information and the video data to be output to the user equipment,
wherein in terms of filtering input information for video data based on the friendship chain data to obtain first input information associated with the second user information in the friendship chain data, the processor is configured to:
obtain second user information associated with the first user information from the friendship chain data;
search, based on the second user information, pre-configured mapping relationships between index identifiers and user information for at least one index identifier matched with the second user information, the at least one index identifier forming a first index identifier set;
match the first index identifier set with a pre-configured index identifier set of input information for the video data, to obtain a successfully-matched second index identifier set, index identifiers in the second index identifier set satisfying the first index identifier set and the second index identifier set simultaneously; and
obtain input information matched with the index identifiers in the second index identifier set to serve as the first input information.

6. The system according to claim 5, wherein before filtering the input information for the video data based on the friendship chain data, input information, the processor is further configured to:
obtain the input information, wherein the input information comprises at least one piece of input information; and
for each piece of the input information, allocate an index identifier, establish a mapping relationship between the index identifier and user information associated with the piece of the input information, and establish a mapping relationship between the index identifier and the video data.

7. The system according to claim 5, wherein the processor is further configured to:
detect an input request for the first input information;

control output display of an input area based on the input request, the input area being associated with the first input information; and
obtain second input information via the input area, the second input information being associated with the first input information.

8. The system according to claim 7, wherein the processor is further configured to control the second input information and the video data to be output.

9. A non-transitory computer storage medium, storing computer-executable instructions for executing a bullet screen information processing method, the method comprising:
when a login authentication request from a user equipment according to an identifier (ID) of a user succeeds, acquiring first user information based on the ID of the user;
acquiring friendship chain data based on the first user information, the friendship chain data comprising second user information associated with the first user information;
filtering input information for video data based on the friendship chain data, to obtain first input information associated with the second user information in the friendship chain data; and
controlling the first input information and the video data to be output to the user equipment,
wherein filtering input information for video data based on the friendship chain data to obtain first input information associated with the second user information in the friendship chain data comprises:
obtaining second user information associated with the first user information from the friendship chain data;
searching, based on the second user information, pre-configured mapping relationships between index identifiers and user information for at least one index identifier matched with the second user information, the at least one index identifier forming a first index identifier set;
matching the first index identifier set with a pre-configured index identifier set of input information for the video data, to obtain a successfully-matched second index identifier set, index identifiers in the second index identifier set satisfying the first index identifier set and the second index identifier set simultaneously; and
obtaining input information matched with the index identifiers in the second index identifier set to serve as the first input information.

10. The non-transitory computer storage medium according to claim 9, wherein before filtering the input information for the video data based on the friendship chain data, the method further comprises:
obtaining the input information, wherein the input information comprises at least one piece of input information; and
for each piece of the input information, allocating an index identifier, establishing a mapping relationship between the index identifier and user information associated with the piece of the input information, and establishing a mapping relationship between the index identifier and the video data.

11. The non-transitory computer storage medium according to claim 9, wherein after the first input information and the video data are output, the method further comprises:
detecting an input request for the first input information;

controlling output and display of an input area based on the input request, the input area being associated with the first input information; and obtaining second input information via the input area, the second input information being associated with the first input information.

12. The non-transitory computer storage medium according to claim 11, wherein the method further comprises: controlling the second input information and the video data to be output.

* * * * *